United States Patent [19]

Huang

[11] Patent Number: 5,054,865

[45] Date of Patent: Oct. 8, 1991

[54] MULTI-OCULAR KALEIDOSCOPE

[76] Inventor: Stanley Huang, 5F No. 474, Sec. 5, Chung Hsio East Rd., Taipei, Taiwan

[21] Appl. No.: 600,838

[22] Filed: Oct. 22, 1990

[51] Int. Cl.⁵ .............................................. G02B 23/00
[52] U.S. Cl. .................................................. 359/617
[58] Field of Search ................................. 350/4.1, 4.2

[56] References Cited

U.S. PATENT DOCUMENTS

| | | | |
|---|---|---|---|
| 2,115,986 | 5/1938 | Da Costa | 350/4.1 |
| 3,383,150 | 5/1968 | Powers | 350/4.2 |
| 3,748,013 | 7/1973 | Orans | 350/4.2 |
| 3,756,685 | 9/1973 | Forsee | 350/4.2 |
| 4,205,893 | 6/1980 | Taylor | 350/4.2 |
| 4,740,046 | 4/1988 | MacCarthy | 350/4.2 |

*Primary Examiner*—Richard A. Wintercorn
*Attorney, Agent, or Firm*—Fleit, Jacobson, Cohn, Price, Holman & Stern

[57] ABSTRACT

A multi-ocular kaleidoscope comprised of two transparent, semi-spherical shells connected into a transparent, spherical shell for containing transparent liquid and colored bits of glass or plastic. The two semi-spherical shells have each an internally threaded circular projection on its outer wall at the center and five internally and externally threaded semi-circular projections around its edge. Seven circular projections are thus formed on the outer wall, after the two semi-spherical shells are connected into a spherical shell, respectively for mounting seven pieces of visual tubes which have each three mirrors fastened therein and connected in a triangular structure.

4 Claims, 4 Drawing Sheets

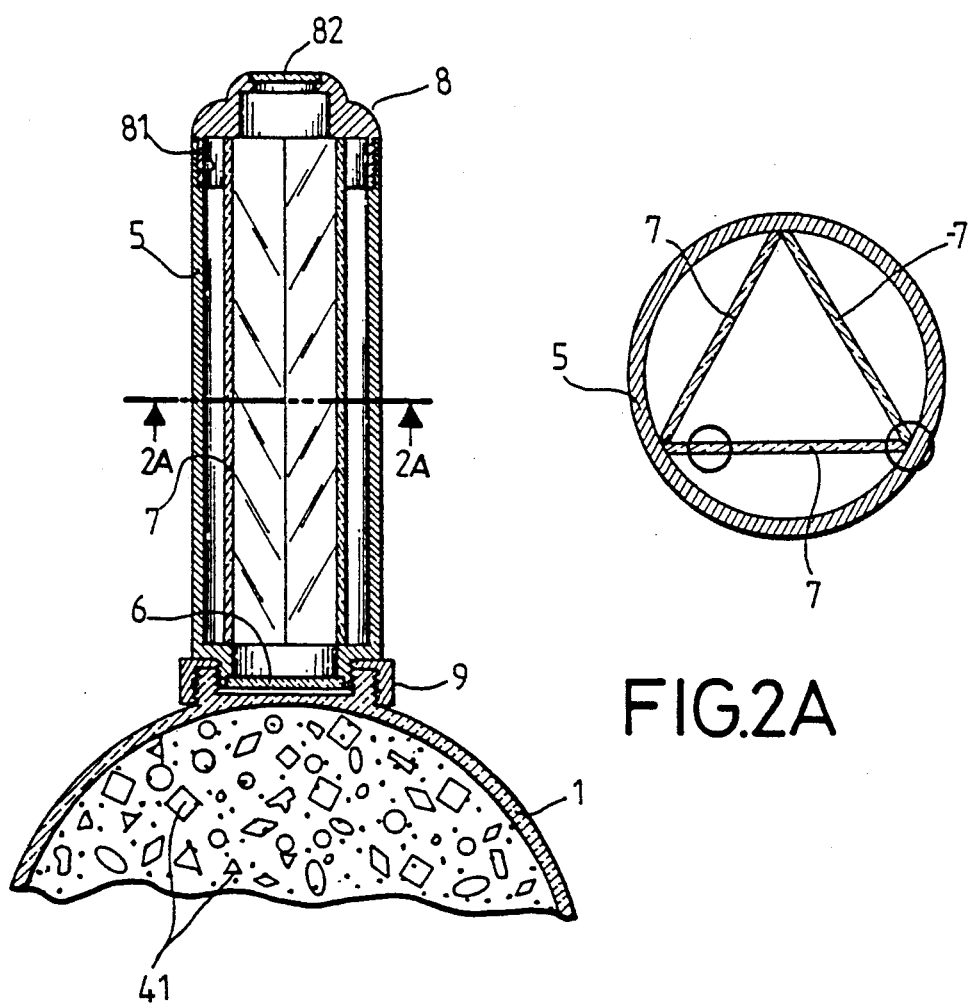
FIG.2
FIG.2A
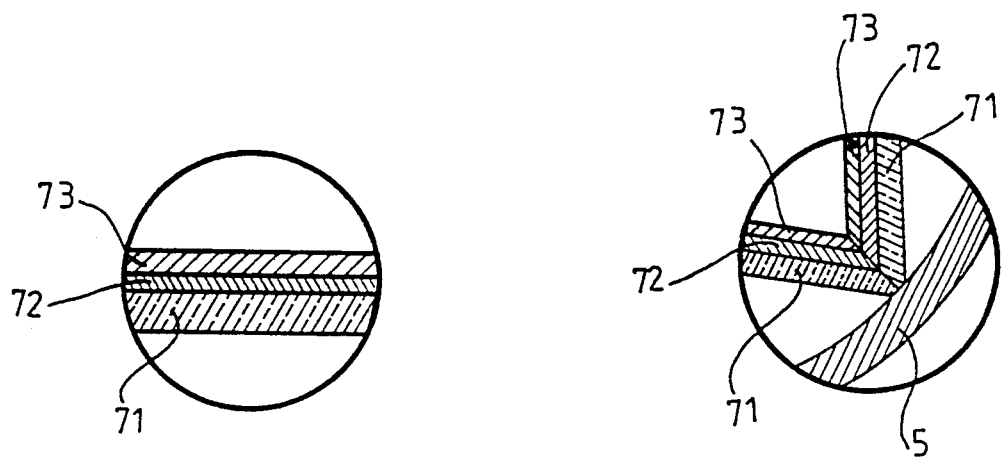
FIG.2B
FIG.2C

MULTI-OCULAR KALEIDOSCOPE

BACKGROUND OF THE INVENTION

The present invention relates to kaleidoscopes, and more particularly relates to a built-up type multi-ocular kaleidoscope which has a plurality of visual tubes of different color for view various symmetrical patterns.

Conventionally, a kaleidoscope is generally comprised of a single tube having an opaque stopper at one end and a visual glass at an opposite end with loose bits of colored glass, plastic, etc. contained therein and reflected by mirrors around the inner wall thereof so that various symmetrical patterns appear when the tube is held to the eye and rotated. Disadvantages of this conventional structure of kaleidoscope are numerous and outlined hereinafter:

1. The visual glass and the opaque stopper may break off easily due to inferior binding strength;
2. The visual tube must be frequently rotated so that symmetrical patterns can be changed;
3. The visual glass must be long enough so that the loose bits of colored glass, pastic, etc can be well and clearly reflected by the mirrors; and
4. Since the morrors and the glass are colorless, the coloration of the change of symmetrical patterns is limited.

SUMMARY OF THE INVENTION

The present invention has been accomplished to eliminate the aforesaid disadvantages. According to the present invention, a multi-occular kaleidoscope is comprised of a transparent spherical shell having colored bits of glass or plastic floating on the transparent liquid filled therein and seven visual tubes fastened on its outer wall for observation. The transparent spherical shell is comprised of two semi-spherical shells having each five internally and externally threaded semi-circular projections around its edge and an internally threaded ring-shaped projection at the center of its outer wall. The semi-circular projections of the first semi-spherical shell are connected with the semi-circular projections of the second semi-spherical shell forming into five ring-shaped projections which are fastened in shape by a lock nut each. Seven visual tubes are respectively fastened in the total seven ring-shaped projections on the spherical shell for viewing variable symmetrical patterns through visual glasses of colors including red, orange, yellow, green, blue, indigo and violet.

The present invention provides various features, including:

1. It can be conveniently dismantled and assembled and it provides multiple oculars for observation;
2. The triangular mirror inside each visual tube is comprised of a layer of transparent glass coated with a layer of mercury coating and then covered with a layer of metal substance in white color, in which the layer of metal substance is disposed at the inner side so that reflection loss is minimized.
3. Total seven pieces of visual tubes are fastened in the transparent spherical shell for viewing variable, colorful symmetrical patterns through visual glasses of colors including red, orange, yellow, green, blue, indigo and violet;
4. The present invention can be used as a DIY toy for teaching children to assemble a kaleidoscope and learn how symmetrical pattersn appear; and
5. Symmetrical patterns are constantly changing due to floating of colored bits of glass or plastic without rotating a visual tube.

SUMMARY OF THE INVENTION

The present invention will now be described by way of example only, with reference to the annexed drawings, in which:

FIG. 2 is a longitudinal sectional view illustrating the connection of a visual tube to a circular projection on the spherical shell of the kaleidoscope;

FIGS. 2A, 2B and 2C are sectional views, illustrating the structure and arrangement of the mirrors.

DETAILED DESCRIPTION OF THE PREFERRED EMBODIMENT

Figure 1:
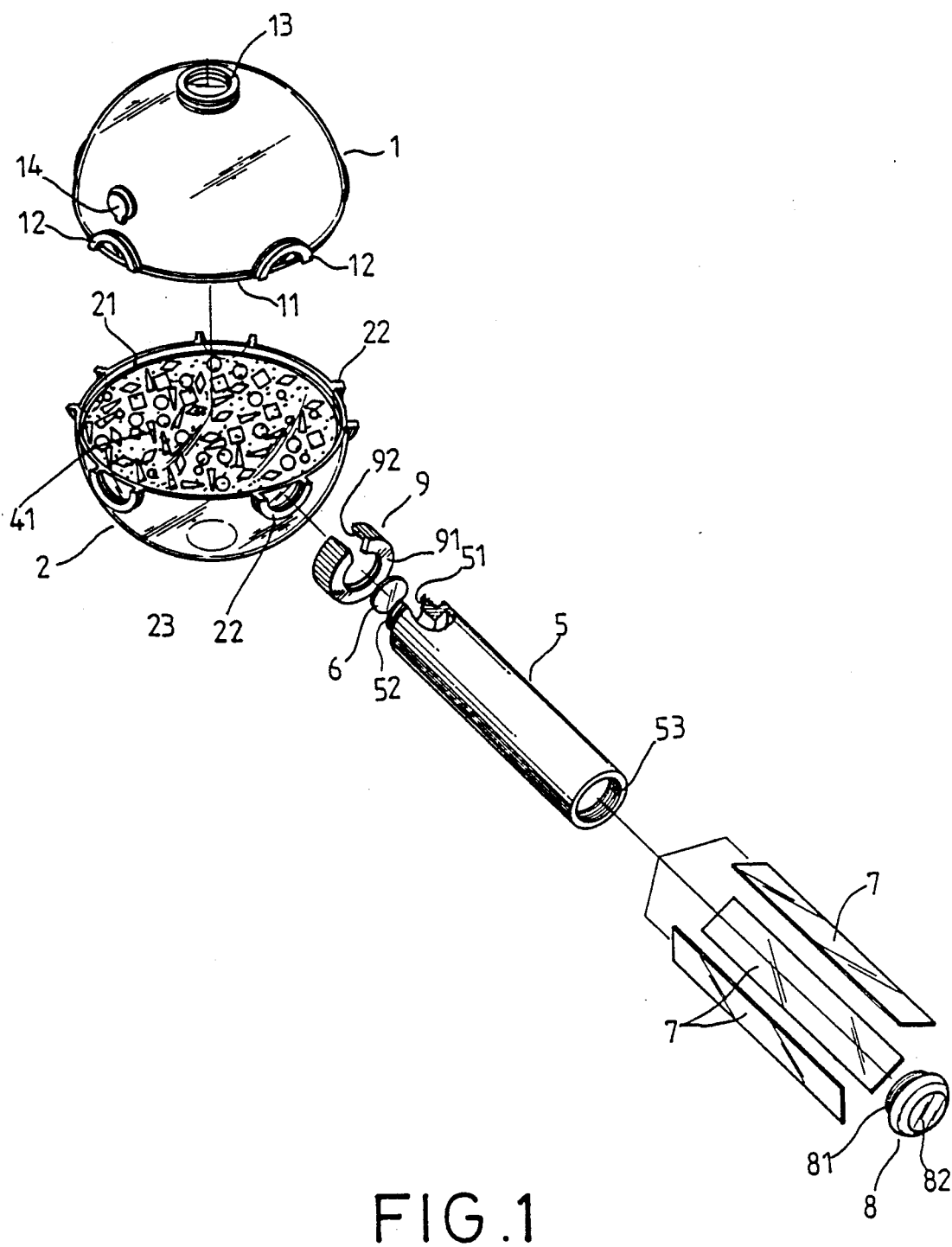
FIG. 1 is a perspective dismanted view of the present invention.

Referring to FIG. 1, a multi-occular kaleidoscope comprises a transparent, spherical shell formed of an upper cover 1 and a bottom cover 2 for mounting a plurality of visual tubes 5. The upper cover 1 has a projecting edge 11 corresponding to the recessed edge 21 on the bottom cover 2 for connection. There are five semi-circular projections 12 or 22 equidistantly formed in the upper as well as the bottom covers 1, 2 around the connecting edge thereof, which semi-circular projections 12 or 22 have each an inner thread as well as an outer thread. There is an externally threaded circular projection 13 or 23 formed in the upper cover 1 as well as the bottom cover 2 at the center of its outer wall surface. A water filling hole 14 is made on either of the two covers 1, 2 and sealed by a rubber cap 15. After the upper and bottom covers 1, 2 are attached together, the five semi-circular projections 12 of the upper cover 1 are respectively connected to the five semi-circular projections 22 of the bottom cover 2 forming into five circular projections which have each an inner thread and an outer thread and are each fastened into shape by a lock nut 9 which has an inner thread 91 for screwing up with the outer thread of each circular projection and a flange 92 at one end. After the upper and bottom covers 1, 2 are fastened into a spherical shell, a visual tube 5 each is respectively fastened in the five circular projections formed of the semi-circular projections 12, 12, and the two internally threaded circular projections 13, 23. Thus, a multi-occular kaleidoscope is set up. After assembly, colorless liquid and bits 41 of colored glass or plastic are filled through the water filling hole 13 into the transparent spherical shell of the multi-ocular kaleidoscope permitting the bits 41 of colored glass or plastic to float on the liquid inside the shell. The visual tube 5 is an elongated round tube, having an outer thread 51 on a projecting end 51 at its one end which is covered with a colored glass 6, an inner thread 53 at its opposite end for fastening the outer thread 81 of a glass holder 8 which has a visual glass 82 transversely covering over its outer thread 81 at one end, and a plurality of mirrors 7 covering over its inner wall surface. In the present preferred embodiment, there are three elongated mirrors 7 fastened inside the visual tube 5 and arranged into a triangular prism. As an alternate form of the present invention, four elongated mirrors may be fastened inside the visual tube and arranged into a quadratic prism. After assembly, there are total seven pieces of visual tubes 5 respectively fastened in the total seven pieces of circular projections on the outer wall of the transparent, spherical shell. The colored glass 6 of each visual tube 5 has a different color. In the present preferred embodiment, total seven colors are used which include red, orange, yellow, green, blue, indigo and violet.

Referring to FIG. 2A—A, the mirrors 7 which are fastened inside the visual tube 5 have each a cross section as illustrated in the sectional view of FIG. 2B. As illustrated, each mirror 7 is comprised of a layer of glass 71 coated with a layer of mercury 72 and then covered with a layer of metal substance 73. The layer of metal substance 73 has a glossy surface in white color and can be made of platinum, aluminum, silver, tin, copper, or any other suitable metal materials. This layer of metal substance 73 protects the layer of mercury 71 from disintegrating or exposing to the eyes (mercury is known poisonous). As illustrated in FIG. 2C, the triangular prism of mirrors 7 is coated with a layer of metal substance 73 on its inside, therefore reflection loss through the mirrors 7 can be minimized.

Figure 3:
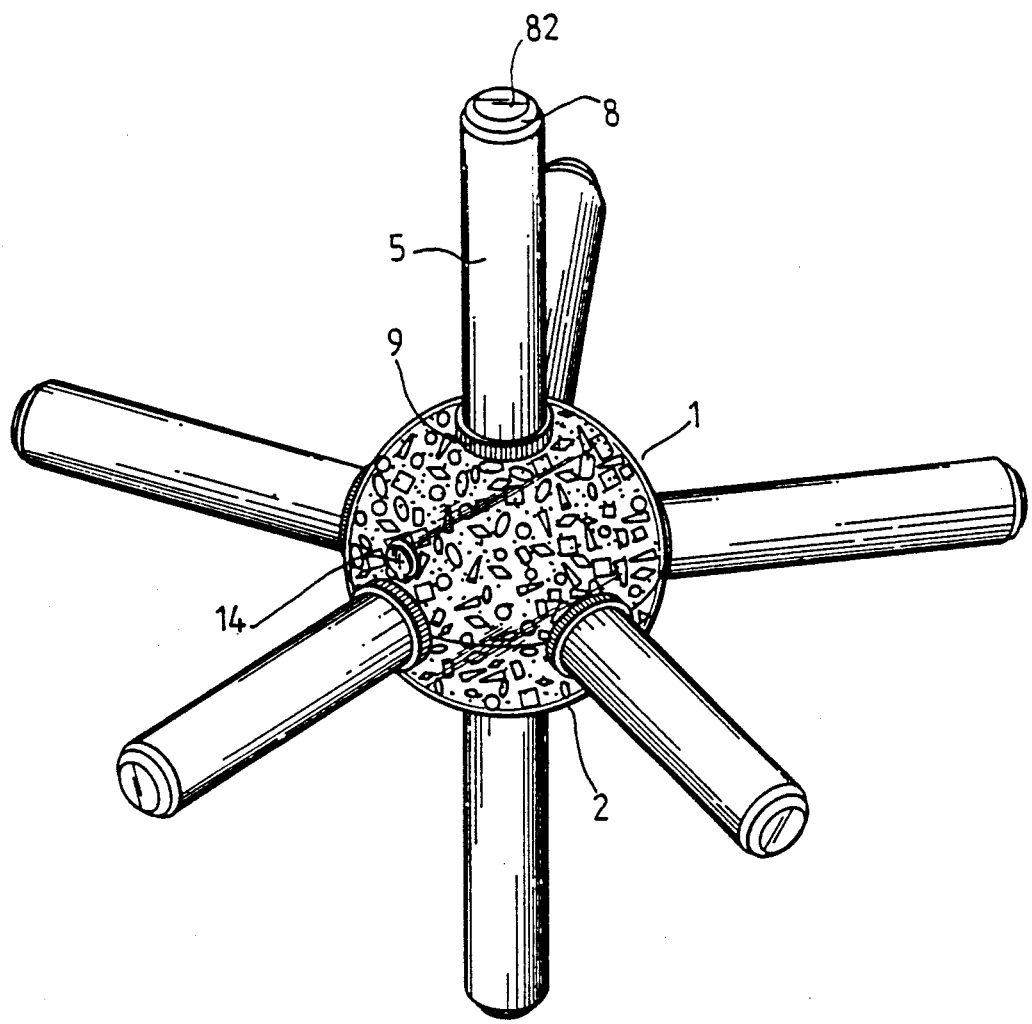
FIG. 3 and 4 are perspective structural assembly views of two preferred embodiments of the present invention.

Referring to FIG. 3, the upper and bottom covers 1, 2 are connected and fixedly fastened together by lock nuts 9 permitting light rays to pass therethrough. The light rays which pass through the spherical shell of the upper and bottom covers 1, 2 are diffusely reflected by the colored bits 41 which float on the liquid filled inside the spherical shell. Therefore, variable symmetric patterns can be views through the visual glass 82 of the glass holder 8 on each visual tube 5.

Figure 4:
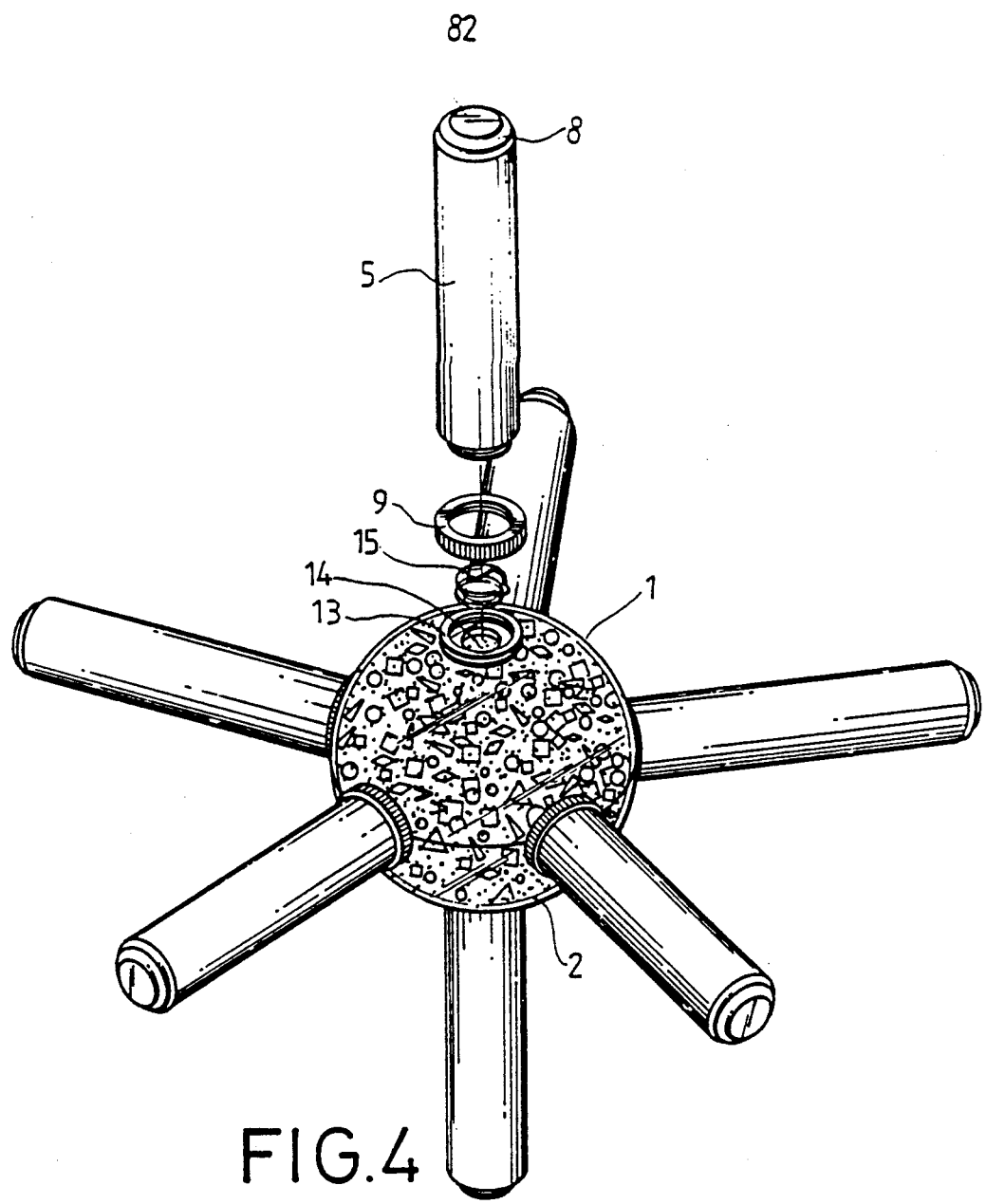

Referring to FIG. 4, the water filling hole 14 may be made on the center of one of the internally threaded circular projections 13 and is sealed by a rubber cap 15.

I claim:

1. A multi-ocular kaleidoscope, comprising:

a transparent, spherical shell formed of a first transparent semi-spherical shell and a second transparent semi-spherical shell, said first transparent semi-spherical shell having a projecting edge, five internally and externally threaded semi-circular projections equidistantly formed around said projecting edge, an externally threaded circular projection at the center of its outer wall surface, said second transparent semi-spherical shell having a recessed edge for engagement with said projecting edge, five internally and externally threaded semi-circular projections equidistantly formed around said recessed edge and respectively connected to the five internally and externally threaded semi-circular projections of said first semi-spherical shell forming into a circular projection each and respectively fastened in shape by a lock nut each, said lock nut having an inner thread and a flange at one end, an externally threaded circular projection at the center of its outer wall surface, either of said first or second transparent semi-spherical shell having a water filling hole releasably sealed with a rubber cap;

five lock nuts for fastening said first and second transparent semi-spherical shells together;

a plurality of colored bits of glass or plastic floating on the liquid filled inside said transparent spherical shell; and seven pieces of visual tubes respectively fastened in the circular projections formed on the outer wall of said transparent spherical shell having each an outer thread on a projecting end at its one end which is covered with a colored glass, an inner thread at its opposite end for mounting a glass holder, and a triangular prism formed of three elongated mirrors fastened on its inside; and seven pieces of visual glasses respectively colored in red, orange, yellow, green, blue, indigo and violet and respectively fastened in the glass holder on said seven pieces of visual tubes.

2. The multi-ocular kaleidoscope of claim 1, wherein said triangular prism of said three elongated mirrors has an outer layer of glass, an inner layer of metal substance and an intermediate layer of mercury coating.

3. The multi-ocular kaleidoscope of claim 2, wherein said inner layer of metal substance can be made either of platinum, aluminum, silver, copper, tin or chrome.

4. The mult-ocular kaleidoscope of claim 1, the five internally and externally threaded semi-circular projections of said first semi-spherical shell are respectively connected to the five internally and externally threaded semi-circular projections of said second semi-spherical shell forming into five internally and externally threaded circular projections.

* * * * *